(12) United States Patent (10) Patent No.: US 12,585,384 B2
Ohsugi (45) Date of Patent: Mar. 24, 2026

(54) METHOD AND DEVICE FOR MANAGING VEHICLE DATA FOR PERFORMING AUTONOMOUS DRIVING CONTROL

(71) Applicant: TOYOTA JIDOSHA KABUSHIKI KAISHA, Toyota (JP)

(72) Inventor: Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/652,155

(22) Filed: May 1, 2024

(65) Prior Publication Data

US 2024/0385749 A1 Nov. 21, 2024

(30) Foreign Application Priority Data

May 15, 2023 (JP) ................................. 2023-080304

(51) Int. Cl.
*G06F 3/06* (2006.01)

(52) U.S. Cl.
CPC .......... *G06F 3/0604* (2013.01); *G06F 3/0652* (2013.01)

(58) Field of Classification Search
CPC ... G06F 3/0604; G06F 3/0652; G07C 5/0841; G06N 20/00; B60W 50/00; B60W 50/04; B60W 60/001; G06V 10/70; G06V 20/58
See application file for complete search history.

(56) References Cited

U.S. PATENT DOCUMENTS

| | | | | |
|---|---|---|---|---|
| 5,684,701 A * | 11/1997 | Breed | ................. | B60R 21/0133 |
| | | | | 180/282 |
| 8,429,359 B1 * | 4/2013 | Desai | .................. | G06F 11/1461 |
| | | | | 711/E12.103 |
| 8,538,919 B1 * | 9/2013 | Nielsen | ............... | H04L 63/0272 |
| | | | | 718/1 |
| 8,593,678 B2 * | 11/2013 | Ohishi | ................. | H04N 1/2166 |
| | | | | 358/1.15 |
| 9,075,705 B2 * | 7/2015 | Hikichi | ................. | G06F 11/004 |
| 9,092,182 B2 * | 7/2015 | Ohishi | ............... | H04N 1/00944 |
| 9,344,596 B2 * | 5/2016 | Ohishi | ............... | H04N 1/00973 |
| 9,800,291 B1 * | 10/2017 | Ben David | ......... | G06F 11/1415 |
| 10,145,684 B1 * | 12/2018 | Tofte | ......................... | G06T 7/20 |
| 11,449,263 B1 * | 9/2022 | Deguchi | .............. | G06F 3/0644 |

(Continued)

FOREIGN PATENT DOCUMENTS

| | | | | | |
|---|---|---|---|---|---|
| CN | 112639913 A | * | 4/2021 | ........ | B60W 50/0205 |
| DE | 102021123721 A1 | * | 3/2022 | .......... | B60W 30/095 |

(Continued)

*Primary Examiner* — Christopher D Birkhimer
(74) *Attorney, Agent, or Firm* — Dinsmore & Shohl LLP

(57) ABSTRACT

A method for managing data related to a vehicle in which autonomous driving control is performed is provided. In the method, it is determined whether artificial intelligence is involved in computer processing for performing the autonomous driving control. In the method, it is also determined whether a predetermined save condition is satisfied. When it is determined that the artificial intelligence is involved in the computer processing and it is determined that the predetermined save condition is satisfied, input and output data of the computer processing within a predetermined save time is saved based on a timing at which it is determined that the predetermined save condition is satisfied in a memory device of the vehicle.

12 Claims, 6 Drawing Sheets

AUTONOMOUS DRIVING CONTROL PORTION

| | | | | |
|---|---|---|---|---|
| 10 | | | | 50 |
| SENSORS | | | | TRAVELING DEVICE |
| 11 | 20 | 30 | 40 | 51 |
| RECOGNITION SENSOR | | | | STEERING DEVICE |
| 12 | SEN RECOGNITION PORTION | RES PLANNING PORTION | TRJ CONTROL AMOUNT CALCULATION PORTION | CON 52 |
| STATE SENSOR | | | | DRIVING DEVICE |
| 13 | | | | 53 |
| POSITION SENSOR | | | | BRAKING DEVICE |
| | SEN | | | |

1

(56) References Cited

U.S. PATENT DOCUMENTS

| | | | | |
|---|---|---|---|---|
| 11,601,303 | B1* | 3/2023 | Schwaiger | H04L 12/40078 |
| 11,704,043 | B1* | 7/2023 | Throgmorton | G06F 11/1469 |
| | | | | 711/162 |
| 11,789,457 | B1* | 10/2023 | Woo | H04R 3/005 |
| | | | | 700/253 |
| 12,294,809 | B1* | 5/2025 | Cao | H04N 5/77 |
| 2004/0117414 | A1* | 6/2004 | Braun | G06F 8/65 |
| 2006/0005074 | A1* | 1/2006 | Yanai | G06F 3/064 |
| | | | | 714/6.32 |
| 2008/0140902 | A1* | 6/2008 | Townsend | H04B 1/0475 |
| | | | | 710/306 |
| 2008/0307020 | A1* | 12/2008 | Ko | G06F 21/6245 |
| 2009/0041230 | A1* | 2/2009 | Williams | G06F 11/1448 |
| | | | | 707/999.204 |
| 2011/0236049 | A1* | 9/2011 | Haga | G03G 15/5004 |
| | | | | 399/75 |
| 2013/0024423 | A1* | 1/2013 | Doshi | G06F 11/1448 |
| | | | | 707/640 |
| 2013/0173554 | A1* | 7/2013 | Ubukata | G06F 11/2094 |
| | | | | 707/640 |
| 2014/0337664 | A1* | 11/2014 | Gokhale | G06F 3/067 |
| | | | | 714/6.3 |
| 2015/0067282 | A1* | 3/2015 | Kobayashi | G06F 3/0619 |
| | | | | 711/158 |
| 2015/0082410 | A1* | 3/2015 | Fitzgerald | H04L 63/08 |
| | | | | 726/9 |
| 2016/0196216 | A1* | 7/2016 | Lee | G06F 3/0631 |
| | | | | 711/170 |
| 2016/0371977 | A1* | 12/2016 | Wingate | G08G 1/096844 |
| 2017/0132082 | A1* | 5/2017 | Resch | G06F 11/1076 |
| 2017/0132086 | A1* | 5/2017 | Blackburn | G06F 11/1466 |
| 2017/0166215 | A1* | 6/2017 | Rander | B60T 8/172 |
| 2017/0329332 | A1* | 11/2017 | Pilarski | B60W 30/0956 |
| 2018/0121112 | A1* | 5/2018 | Imazaki | G06F 3/0619 |
| 2018/0173624 | A1* | 6/2018 | Lv | G06F 12/0893 |
| 2018/0272963 | A1* | 9/2018 | Meyhofer | B60W 50/023 |
| 2018/0349227 | A1* | 12/2018 | Cisler | G06F 11/1451 |
| 2019/0278667 | A1* | 9/2019 | Mitkar | G06F 11/1456 |

| | | | | |
|---|---|---|---|---|
| 2019/0318267 | A1 | 10/2019 | Zhang et al. | |
| 2019/0324458 | A1* | 10/2019 | Sadeghi | G05D 1/0276 |
| 2020/0143670 | A1* | 5/2020 | Kitani | G06V 10/764 |
| 2020/0250901 | A1 | 8/2020 | Golov | |
| 2020/0349666 | A1* | 11/2020 | Hodge | G01C 21/3602 |
| 2020/0401937 | A1* | 12/2020 | Tokuchi | G06N 20/00 |
| 2021/0197848 | A1* | 7/2021 | Kilaru | G06N 7/01 |
| 2021/0248842 | A1* | 8/2021 | Dittrich | G06F 11/3476 |
| 2021/0295441 | A1* | 9/2021 | Mullen | G08G 1/0112 |
| 2021/0403050 | A1* | 12/2021 | Gan | B60W 60/0027 |
| 2022/0051490 | A1 | 2/2022 | Sato | |
| 2022/0063672 | A1* | 3/2022 | Corbett | B60W 60/0016 |
| 2022/0063758 | A1* | 3/2022 | Corbett | B62D 5/0409 |
| 2022/0066448 | A1* | 3/2022 | Corbett | B62M 6/65 |
| 2022/0172606 | A1* | 6/2022 | Pandya | G08G 1/052 |
| 2022/0358835 | A1* | 11/2022 | Graver | G08G 1/0116 |
| 2023/0063930 | A1 | 3/2023 | Ichida et al. | |
| 2023/0065987 | A1* | 3/2023 | Mukhtar | H04L 63/0428 |
| 2023/0101555 | A1* | 3/2023 | Hundert | H04B 7/0617 |
| | | | | 455/414.1 |
| 2023/0112692 | A1* | 4/2023 | Richard | G06F 3/0604 |
| | | | | 711/154 |
| 2023/0118854 | A1* | 4/2023 | Katari | G06F 11/3457 |
| | | | | 714/57 |
| 2023/0266756 | A1* | 8/2023 | Wengreen | G05D 1/617 |
| | | | | 701/23 |
| 2023/0362172 | A1* | 11/2023 | Mandagere | G06F 21/6272 |
| 2024/0067194 | A1* | 2/2024 | Slattery | B60W 50/06 |
| 2024/0124002 | A1* | 4/2024 | Lee | B60W 50/029 |
| 2024/0185090 | A1* | 6/2024 | Rafferty | G06N 20/00 |
| 2024/0253644 | A1* | 8/2024 | Itsuji | B60W 50/14 |
| 2024/0256953 | A1* | 8/2024 | Björklund | G06N 20/00 |

FOREIGN PATENT DOCUMENTS

| | | | | |
|---|---|---|---|---|
| JP | 2018-190045 | A | 11/2018 | |
| JP | 2019-185783 | A | 10/2019 | |
| JP | 2020-144450 | A | 9/2020 | |
| JP | 2021-174413 | A | 11/2021 | |
| WO | WO-2019032861 | A1 * | 2/2019 | G16H 10/65 |
| WO | WO-2022261674 | A1 * | 12/2022 | H04B 7/18504 |

* cited by examiner

INS_LOG

| GROUP ID | EVENT ID | EVENT NAME EN | PRIORITY PL | EVENT DETERMINATION On/Off |
|---|---|---|---|---|
| GI1 | EI1 | EN1 | 4 | On |
|  | EI2 | EN2 | 3 | On |
|  | EI3 | EN3 | 4 | On |
|  | EI4 | EN4 | 3 | On |
|  | EI5 | EN5 | 3 | On |
| GI2 | EI6 | EN6 | 3 | On |
|  | EI7 | EN7 | 2 | Off |
|  | EI8 | EN8 | 1 | Off |
| ⋮ | ⋮ | ⋮ | ⋮ | ⋮ |
| GIm | EIn | ENn | 5 | Off |

1

METHOD AND DEVICE FOR MANAGING VEHICLE DATA FOR PERFORMING AUTONOMOUS DRIVING CONTROL

CROSS-REFERENCE TO RELATED APPLICATION

The present application claims priority under 35 U.S.C. § 119 to Japanese Patent Application No. 2023-080304, filed on May 15, 2023, the contents of which application are incorporated herein by reference in their entirety.

TECHNICAL FIELD

The present disclosure relates to a method and a device for managing data acquired by a vehicle.

BACKGROUND

JP2020-14450A discloses a system for collecting data relevant to a vehicle. In the related art, the data collection relevant to the vehicle is performed when a preset scene is occurred. The preset scene includes a scene in which the vehicle is rapidly accelerated or rapidly decelerated in light of a predetermined reference, a scene in which an override to autonomous driving being executed is detected, a scene in which a collision prediction of the vehicle is performed, a scene in which lane lateral displacement is large in light of a predetermined reference, a scene in which a warning for eyes closing of a driver of the vehicle is performed, and the like. In the collection of data relevant to the vehicle, types, units, and the like of data to be collected are also set in advance. The collected data is transmitted from the vehicle to a server that analyzes the data.

Examples of documents showing the technical level of the technical field relating to the present disclosure include JP2019-185783A in addition to JP2020-14450A.

Recently, artificial intelligence (AI), which has been remarkably evolved, has started to be applied to a part of autonomous driving control of a vehicle. Examples of application of AI to the autonomous driving control include application to computer processing such as a "peripheral recognition" by the vehicle, a "path planning" by the vehicle, and an "operation planning" by the vehicle.

When AI is applied to the autonomous driving control, it is desirable that an evaluation, a verification, and the like for the application be performed in real time or later. In this case, it is ideal that all data related to computer processing for performing the autonomous driving control is temporarily saved in a memory device mounted on the vehicle, and is appropriately transmitted to a server outside the vehicle and stored.

However, while it is assumed that an amount of data related to the computer processing for performing the autonomous driving control is enormous, capacity of an in-vehicle memory device is limited. Therefore, when AI is involved in the computer processing for performing the autonomous driving control, there is room for consideration as to which data among the data involved in the computer processing should be saved in the in-vehicle memory device. Further, there is room for a development of a method for saving the data to be saved in the in-vehicle memory device.

An object of the present disclosure is to provide a technique capable of appropriately saving data related to AI among the data related to the computer processing for performing the autonomous driving control of the vehicle in a memory device mounted on the vehicle and suppressing a situation in which a free space of the memory device is insufficient due to the data saving.

SUMMARY

A first aspect of the present disclosure is a method for managing data related to a vehicle in which autonomous driving control is performed, the method including the following features.

The method comprising the steps of:

determining whether artificial intelligence is involved in computer processing for performing the autonomous driving control;

determining whether a predetermined save condition is satisfied; and when it is determined that the artificial intelligence is involved in the computer processing and it is determined that the predetermined save condition is satisfied, saving in a memory device of the vehicle input and output data of the computer processing within a predetermined save time based on a timing at which the predetermined save condition is determined to be satisfied.

A second aspect of the present disclosure is directed to a device for managing data related to a vehicle in which autonomous driving control is performed, the device having the following features.

The device comprises a processor configured to perform computer processing for performing the autonomous driving control.

The processor is configured to:

determine whether artificial intelligence is involved in the computer processing; determine whether a predetermined save condition is satisfied;

when it is determined that the artificial intelligence is involved in the computer processing and it is determined that the predetermined save condition is satisfied, save in a memory device of the vehicle input and output data of the computer processing within a predetermined save time based on a timing at which it is determined that the predetermined save condition is satisfied.

According to the present disclosure, when it is determined that AI is involved in the computer processing and it is determined that the predetermined save condition is satisfied, the input and output data of the computer processing is saved in the memory device of the vehicle. Therefore, among data related to the computer processing for performing the autonomous driving control, the data related to AI can be appropriately saved in the memory device of the vehicle. In addition, since all data related to AI is not saved, but only data within the predetermined save time based on the time at which it is determined that the save condition is satisfied is saved, it is possible to suppress a situation in which the free capacity of the memory device is insufficient.

DESCRIPTION OF EMBODIMENT

1. Autonomous Driving of Vehicle

Figure 1:
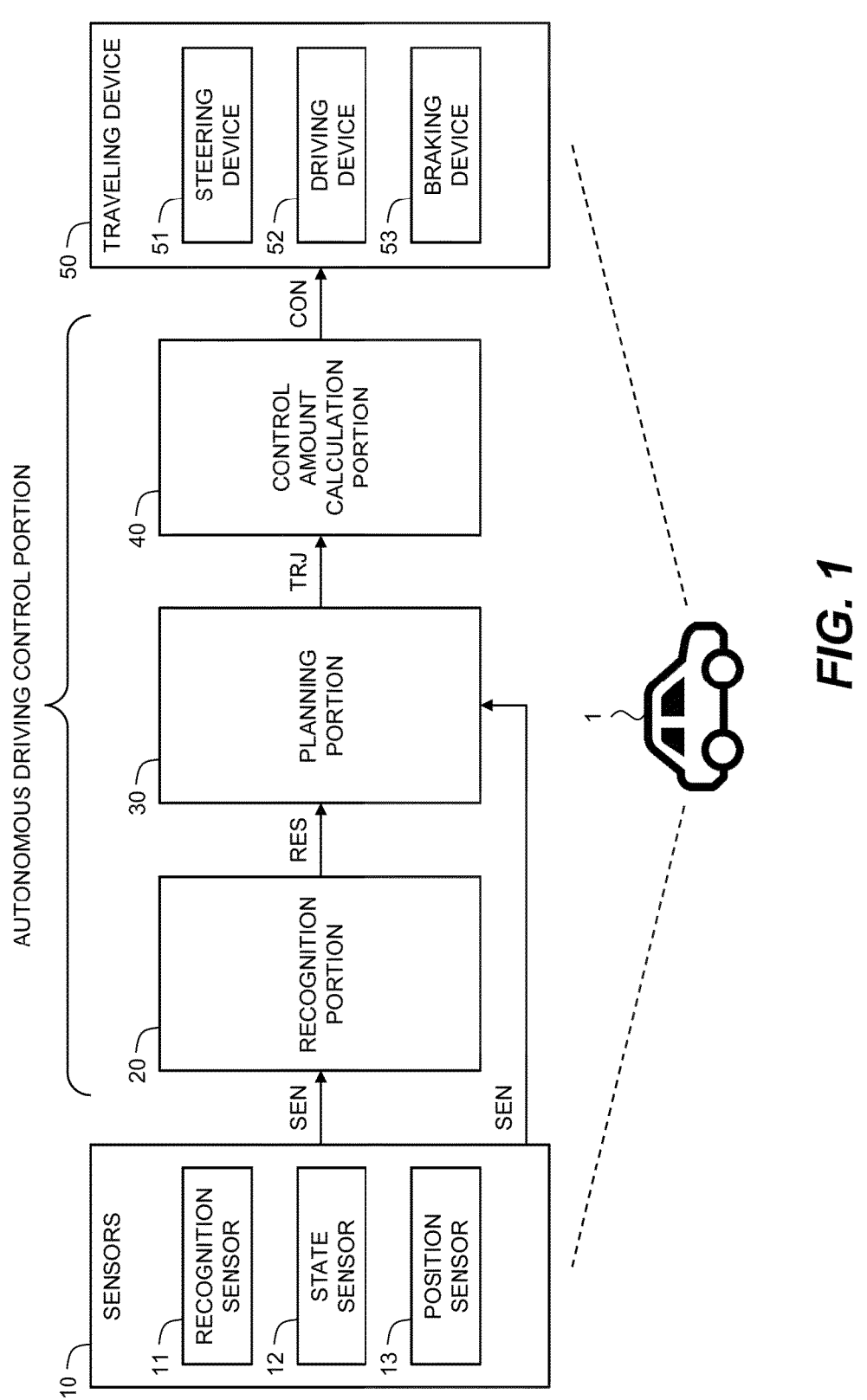
FIG. 1 is a block diagram illustrating a configuration example related to autonomous driving control of a vehicle according to an embodiment.

FIG. 1 is a block diagram illustrating a configuration example related to autonomous driving control of a vehicle 1 according to the present embodiment. The autonomous driving is to automatically perform at least one of steering, acceleration, and deceleration of the vehicle 1 without depending on a driving operation by an operator of the vehicle 1. The autonomous driving control is a concept including not only completely autonomous driving control but also risk avoidance control, lane keep assist control, and the like. The operator may be a driver riding in the vehicle 1 or a remote operator who remotely operates the vehicle 1.

The vehicle 1 includes sensors 10, a recognition portion 20, a planning portion 30, a control amount calculation portion 40, and a driving device 50.

The sensors 10 include a recognition sensor 11 used for recognizing a situation around the vehicle 1. Examples of the recognition sensor 11 include a camera, a laser imaging detection and ranging (LIDAR), and a radar. The sensors 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, and a steering angle sensor. Examples of the position sensor 13 include a global navigation satellite system (GNSS) sensor.

Information on sensor detection SEN is information obtained by the sensors 10. For example, the information on sensor detection SEN includes an image captured by the camera. As another example, the information on sensor detection SEN may include point group information obtained by the LIDAR. The information on sensor detection SEN may include vehicle status information indicating the status of the vehicle 1. The information on sensor detection SEN may include positional information indicating the position of the vehicle 1.

The recognition portion 20 receives the information on sensor detection SEN. The recognition portion 20 recognizes the situation around the vehicle 1 based on information obtained by the recognition sensor 11. For example, the recognition portion 20 recognizes an object around the vehicle 1. Examples of the object include a walker, other vehicles (a preceding vehicle, a parking vehicle, and the like), a white lane, a road construction (for example, guard rail, curb), a fallen object, a traffic light, an intersection, a mark, and the like. Information on recognition result RES indicates a recognition result by the recognition portion 20. For example, the information on recognition result RES includes object information indicating a relative position and a relative speed of the object with respect to the vehicle 1.

The planning portion 30 receives information on recognition result RES from the recognition portion 20. In addition, the planning portion 30 may receive vehicle status information, positional information, and pre-generated map information. The map information may be high-precision three-dimensional map information. The planning portion 30 generates a driving plan of the vehicle 1 based on the received information. The driving plan may be for reaching a destination set in advance or for avoiding a risk. Examples of the driving plan include maintaining the current traveling lane, changing lanes, performing an overtake, turning right or left, steering, accelerating, decelerating, and stopping. Further, the planning portion 30 generates a target trajectory TRJ required for the vehicle 1 to travel in accordance with the driving plan. The target trajectory TRJ includes a target position and a target speed.

The control amount calculation portion 40 receives the target trajectory TRJ from the planning portion 30. The control amount calculation portion 40 calculates a control amount CON required for the vehicle 1 to follow the target trajectory TRJ. The control amount CON may be a control amount required to reduce a deviation between the vehicle 1 and the target trajectory TRJ. The control amount CON includes at least one of a steering control amount, a drive control amount, and a braking control amount. Examples of the steering control amount include a target steering angle, a target torque, a target motor angle, and a target motor drive current. Examples of the drive control amount include target speed, target acceleration, and the like. As the braking control amount, target speed, target deceleration, and the like are exemplified.

The driving device 50 includes a steering device 51, a driving device 52, and a braking device 53. The steering device 51 steers wheels of the vehicle 1. For example, the steering device 51 includes an electric power steering (EPS) device. The driving device 52 is a power source that generates a driving force. Examples of the driving device 52 include an engine, an electric motor, and an in-wheel motor. The braking device 53 generates a braking force. The driving device 50 receives the control amount CON from the control amount calculation portion 40. The driving device 50 operates the steering device 51, the driving device 52, and the braking device 53 in accordance with the steering control amount, the drive control amount, and the braking control amount, respectively. As a result, the vehicle 1 travels so as to follow the target trajectory TRJ.

The recognition portion 20 includes at least one of rule-based models and machine learning models. The rule-based models perform recognition processing based on a predetermined rule group. Examples of the machine learning models include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN are arbitrary. The machine learning models are generated in advance through machine learning. The recognition portion 20 performs the recognition processing by inputting the information on sensor detection (SEN) to the models. The information on recognition result RES is output from the models or generated based on the output from the models.

The planning portion 30 may also include at least one of the rule-based models and the machine learning models. The planning portion 30 performs the planning processing by inputting the information on recognition result RES to the models. The target trajectory TRJ is output from the models or generated based on the output from the models.

The control amount calculation portion 40 also includes at least one of the rule-based models and the machine learning models. The control amount calculation portion 40 performs the control amount calculation processing by inputting the target trajectory TRJ to the models. The control amount CON is output from the models or generated based on the output from the models.

Two or more of the recognition portion 20, the planning portion 30, and the control amount calculation portion 40 may be integrally configured. All the recognition portion 20, the planning portion 30, and the control amount calculation portion 40 may be integrally configured (End-to-End configuration). For example, the recognition portion 20 and the planning portion 30 may be integrally configured by the NN that outputs the target trajectory TRJ from the information on sensor detection SEN. Even in the case of the integrated configuration, an intermediate information such as the information on recognition result RES or the target trajectory TRJ may be output. For example, when the recognition portion 20 and the planning portion 30 are integrally configured by the NN, the information on recognition result RES may be an output of an intermediate layer of the NN.

The recognition portion 20, the planning portion 30, and the control amount calculation portion 40 constitute an autonomous driving control portion that controls autonomous driving of the vehicle 1. In the present embodiment, the machine learning models are used for at least a part of the autonomous driving control portion. That is, at least one of the recognition portion 20, the planning portion 30, and the control amount calculation portion 40 may include the machine learning models. The autonomous driving control portion may perform at least a portion of the autonomous driving control of the vehicle 1 using the machine learning models.

2. Autonomous Driving System

Figure 2:
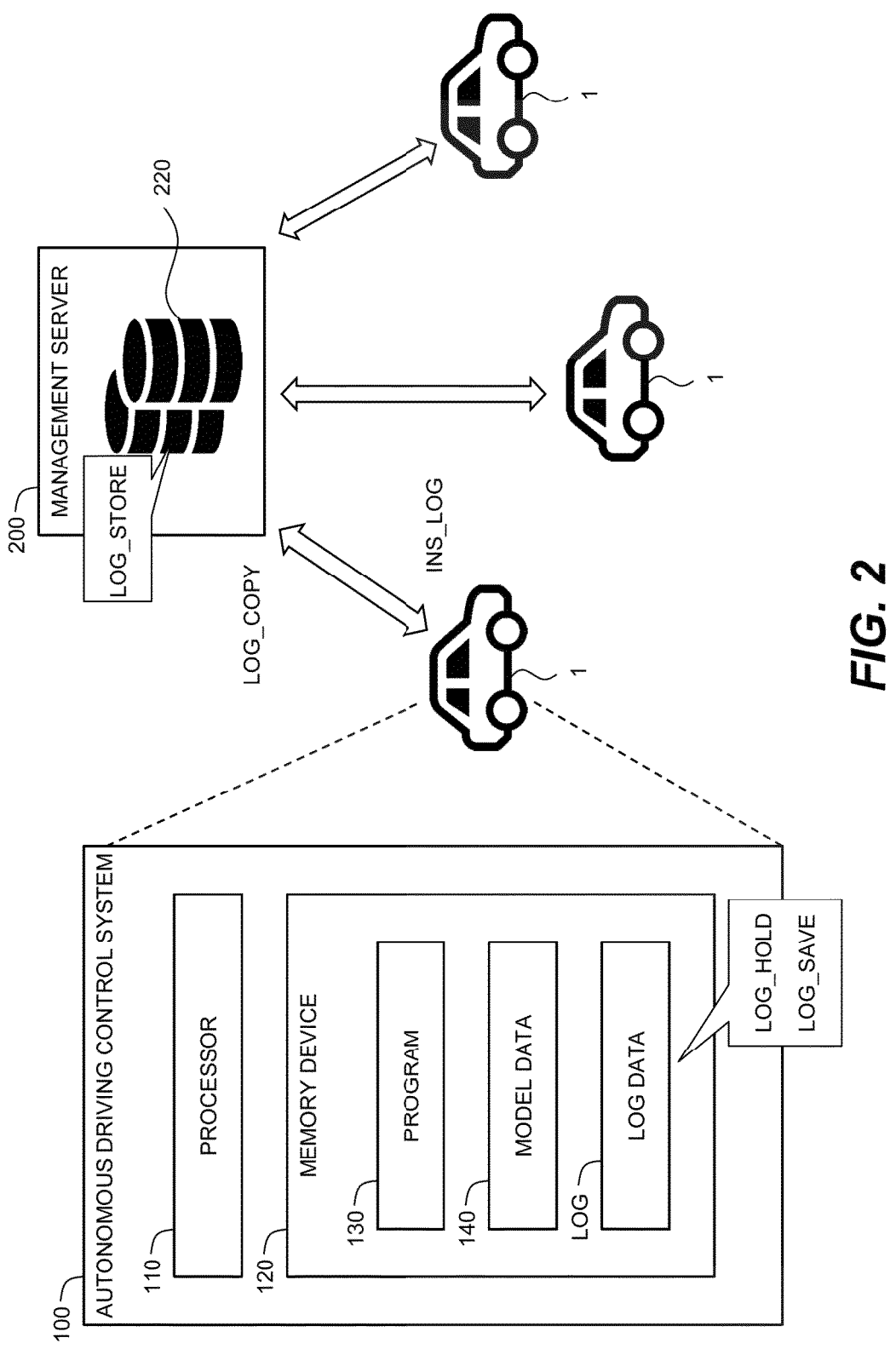
FIG. 2 is a conceptual diagram illustrating an example of a configuration of an autonomous driving system according to the embodiment.

FIG. 2 is a conceptual diagram illustrating a configuration example of an autonomous driving system 100 according to the present embodiment. The autonomous driving system 100 is mounted on the vehicle 1 and performs the autonomous driving control of the vehicle 1. The autonomous driving system 100 has at least the function of the autonomous driving control portion described above. The autonomous driving system 100 may further include the sensors 10 and the driving device 50.

The autonomous driving system 100 includes one or more processors 110 (hereinafter, simply referred to as a "processor" 110) and one or more memory devices 120 (hereinafter, simply referred to as a "memory device 120"). The processor 110 executes various processing. Examples of the processor 110 include a central processing unit (CPU), a graphics processing unit (GPU), an application specific integrated circuit (ASIC), and a field-programmable gate array (FPGA). The recognition portion 20, the planning portion 30, and the control amount calculation portion 40 may be implemented by a single processor 110 or may be implemented by separate processors 110. The memory device 120 stores various information. Examples of the memory device 120 include a hard disk drive (HDD), a solid-state drive (SSD), a volatile memory, and a nonvolatile memory.

Program 130 is a computer program for controlling the vehicle 1, and is executed by the processor 110. Various computer processing by the autonomous driving system 100 may be realized by cooperation between the processor 110 that executes the program 130 and the memory device 120. The program 130 is stored in the memory device 120. The program 130 may be recorded in a computer-readable recording medium.

Model data 140 is data of the models included in the recognition portion 20, the planning portion 30, and the control amount calculation portion 40. As described above, in the present embodiment, at least one of the recognition portion 20, the planning portion 30, and the control amount calculation portion 40 includes the "machine learning models". The model data 140 is stored in the memory device 120 and used for the autonomous driving control.

During the autonomous driving control, the processor 110 acquires "log data LOG". The log data LOG may include the information on sensor detection SEN input to the autonomous driving control portion. The log data LOG may include the control amount CON output from the autonomous driving control portion. The log data LOG may include the information on recognition result RES output from the recognition portion 20. The log data LOG may include the target trajectory TRJ output from the planning portion 30. The log data LOG may include a reason for a decision in the recognition processing by the recognition portion 20. The log data LOG may include a reason for a decision in the planning process by the planning portion 30. The log data LOG may include presence or absence of an operator intervention for the autonomous driving control.

The processor 110 temporarily "holds" the log data LOG acquired during the autonomous driving control. Specifically, the processor 110 "holds" the log data LOG acquired during the autonomous driving control for a predetermined holding time Phold. Hereinafter, the temporarily held log data LOG is also referred to as "log data LOG_HOLD". The log data LOG_HOLD corresponds to "temporary holding data" of the present disclosure. The processor 110 deletes the log data LOG held after the holding time Phold elapses from the memory device 120. The processor 110 may compress and save the log data LOG, which is held after the holding time Phold elapses, in the memory device 120 without deleting the log data LOG.

The processor 110 also makes a determination regarding "save" of the log data LOG_HOLD (hereinafter, also referred to as a "save determination"). The processor 110 may store at least a portion of the log data LOG_HOLD in the memory device 120 based on a result of the save determination. The save determination will be described in detail later. Hereinafter, the log data LOG_HOLD saved in the memory device 120 based on the result of the save determination may be referred to as "log data LOG_SAVE". The processor 110 may delete log data LOG_HOLD that is not saved in the memory device 120 from the memory device 120 without waiting for the holding time Phold to elapse based on the result of the save determination.

The processor 110 generates a copy of at least a part of the log data LOG_SAVE (hereinafter, also referred to as "log data LOG_COPY") and transmits (uploads) the copy to a memory device outside the vehicle 1. The log data LOG_COPY corresponds to "copy data" of the present disclosure. When the processor 110 transmits the log data LOG_COPY to the external memory device, the processor 102 deletes the original log data LOG (i.e., the log data LOG_SAVE) corresponding to the log data LOG_COPY from the memory device 120. The processor 110 may continue to save the original log data LOG in the memory device 120 by compressing the original log data LOG without deleting it.

A management server 200 is a computer that exists outside the vehicle 1. The management server 200 communicates with one or more vehicles 1 (hereinafter, simply referred to as a "vehicle 1") via a communication network. The management server 200 includes a database 220. The management server 200 receives the log data LOG_COPY from the vehicle 1. The management server 200 also stores the received log data LOG_COPY in the database 220. The log data LOG_COPY is stored in the database 220 for a predetermined storage period. Hereinafter, log data LOG_COPY stored in the database 220 is also referred to as "log data LOG_STORE".

The management server 200 transmits an instruction INS_LOG regarding a management of the log data LOG to the vehicle 1. In the instruction INS_LOG, a predetermined event PE or the like which is a saving target of the log data LOG is specified among events related to a behavior of the vehicle 1. The instruction INS_LOG is provided from the management server 200 to the vehicle 1 at a predetermined timing in a day (e.g., a timing at which the ignition of the vehicle 1 is turned on). The original data of the instruction INS_LOG is stored in the database 220. Content of the original data is updated by the management server 200.

Figure 3:
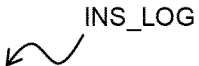
FIG. 3 is a diagram showing an example of an instruction related to management of log data.

FIG. 3 is a diagram showing an example of the instruction INS_LOG. In the example illustrated in FIG. 3, the instruction INS_LOG includes items of a group ID, an event id, an event name EN, a priority PL, and an event determination ON/OFF. The instruction INS_LOG may include other items in addition to these items. As the other items, a pattern for acquiring log data LOG and a list of points (latitude and longitude) for acquiring log data LOG are exemplified.

The group ID is an item for identifying a group to which the predetermined event PE belongs. In the example shown in FIG. 3, GI1, GI2, and GIm (m is a positive integer of 3 or more) are set as the group IDs. The GI1 is, for example, the identification of a group related to the autonomous driving control of the vehicle 1. The GI2 is, for example, the identification of a group related to an external recognition by the vehicle 1. The GIm is, for example, an ID of a group related to an occurrence of an abnormality in various systems mounted on the vehicle 1.

The event id is an item for identifying a predetermined event PE. In the example shown in FIG. 3, EI1, EI2, EI3, EI4, and EI5 are set as the event ids of the GI1. The EI1 is, for example, an identifier indicating a detection of a rapid acceleration or a rapid deceleration of the vehicle 1. The EI2 is, for example, an identifier indicating a detection of an operation transition demand (TD) by the driver of the vehicle 1. The EI3 is, for example, an identifier indicating a detection of a sharp turn of the vehicle 1. The EI4 is, for example, an identifier indicating a detection of a behavior of the vehicle 1 different from a behavior of surrounding vehicles. The EI5 is, for example, an identifier indicating a detection of a short inter-vehicular distance between a preceding vehicle or a following vehicle.

In the example shown in FIG. 3, EI6 to EI8 are set as the event ids of the GI2. The EI6 is, for example, misidentification information. The EI7 is, for example, an identifier indicating detection of a cloud. The EI8 is, for example, an identifier indicating the detection of a raindrop. In the event id of the GIm, EIn is set (n is a natural number of 3 or more). The EIn is, for example, an ID indicating detection of an error signal.

The event name EN is an item that plainly indicates the content of the predetermined event PE. In the example shown in FIG. 3, EN1 to ENn are set as the event name EN. EN1 to ENn correspond to EI1 to EIn, respectively.

The priority PL is an item indicating the priority of saving log data LOG (that is, log data LOG_HOLD) in the memory device 120 when the predetermined event PE occurs. The priority PL is also an item indicating a priority for transmitting log data LOG (that is, log data LOG_COPY) to the management server 200. In the example shown in FIG. 3, the priority PL is divided into five levels of 1 to 5. The larger the number of priority PL is, the higher priority is given to the save of the log data LOG of the predetermined event PE. Further, as the number of priority PL is larger, the transmission of log data LOG is given priority.

The event determination ON/OFF is an item indicating whether the predetermined event PE is handled as "save target event STE". The save target event STE is an event for saving the log data LOG in the middle of the predetermined event PE in the memory device 21. The predetermined event PE of which the event determination is "On" is handled as the save target event STE. The predetermined event PE with the event determination of "Off" is not handled as the save target event STE. That is, the log data LOG in the middle of the predetermined event PE of which the event determination is "On" is saved in the memory device 21, and the log data LOG of which the event determination is not "On" is not saved in the memory device 21.

Figure 4:
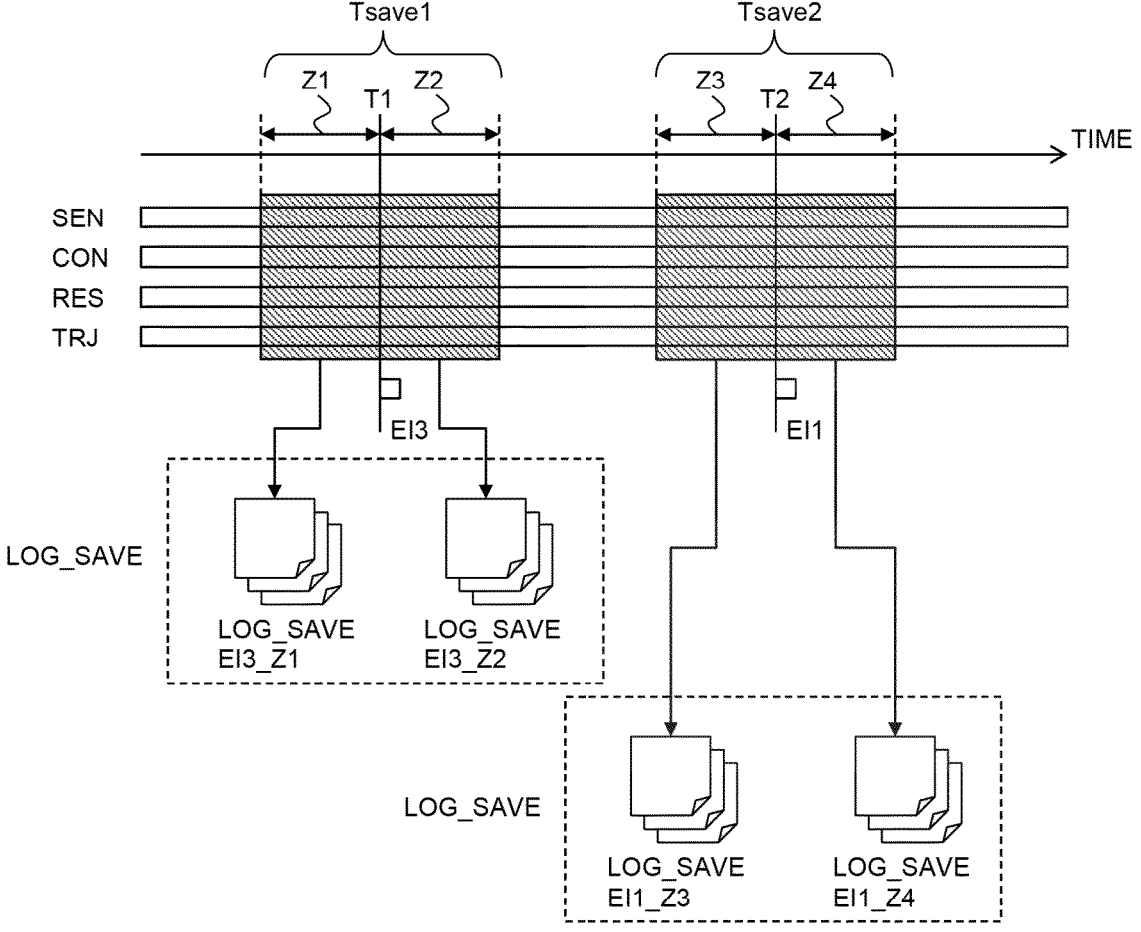
FIG. 4 is a diagram for explaining save time in which log data is extracted and saved.

Here, the log data LOG in the middle of the predetermined event PE will be described with reference to FIG. 4. In the example shown in FIG. 4, the predetermined event PE with event id=EI3 occurs in time t1. In addition, the predetermined event PE with event id=EI1 occurs in time t2. Note that the predetermined event PEs with event id=EI1 and event id=EI3 both correspond to the predetermined event PE with event determination "On" (i.e., the save target event STE) (see FIG. 3).

When the predetermined event PE that has occurred at a certain time corresponds to the save target event STE, data of a predetermined save time Tsave is extracted from the log data LOG of the save target event STE. The extracted log data LOG is then saved in the memory device 120. This log data LOG corresponds to the above-described log data LOG_SAVE. In the upper part of FIG. 4, the log data LOG including the information on sensor detection SEN, the control amount CON, the information on recognition result RES, and the target trajectory TRJ is depicted. The log data LOG is in a state of being held in the memory device 120, that is, the log data LOG_HOLD.

The save time Tsave at which the log data LOG is extracted and saved is set based on the time at which the save target event STE is determined to have occurred. In the example shown in FIG. 4, it is determined that two types of save target event STE have occurred in times t1 and t2. The save time EI3 for the first save target event STE (event id=Tsave1) includes a time zone Z1 before the time t1 and a time zone Z2 after the time t1. The save time EI1 for the second save target event STE (event id=Tsave2) includes a time zone Z3 before the time t2 and a time zone Z4 after the time t2.

Lengths of the time zones Z1, Z2, Z3, and Z4 are, for example, 1 to 10 seconds. However, it may take time to determine whether the predetermined event PE corresponds to the save target event STE. Therefore, it is assumed that the time at which it is determined that the save target event STE has occurred is slightly later than the time at which the save target event STE has occurred. Therefore, it is desirable that the lengths of the time zones Z1, Z2, Z3, and Z4 (i.e., the lengths of save time Tsave1 and Tsave2) are set for each content (the event id) of the save target event STE.

3. Save Determination

As described above, in the autonomous driving system 100, the autonomous driving control is performed using at least one of rule-based models and machine learning models. When the machine learning models are used even in a part of the autonomous driving control, it is desirable to evaluate and verify the machine learning models. Therefore, in the present embodiment, in order to enable evaluation, verification, and the like using the log data LOG, when the machine learning models are applied to at least a part of the functions of the autonomous driving control portion (i.e., the recognition portion 20, the planning portion 30, and the control amount calculation portion 40), information indicating that AI is involved is added to the log data LOG.

Hereinafter, the log data LOG to which information indicating that AI is involved is added also referred to as "log data LOG_AI". To distinguish from the log data LOG_AI, the log data LOG in a case where all functions of the autonomous driving control portion are implemented by the rule-based models is referred to as "log data LOG_RL".

In the present embodiment, the management server 200 performs an evaluation, a verification, and the like of the autonomous driving control using the machine learning models. For this purpose, it is necessary to transmit the log data LOG_AI acquired during the autonomous driving control to the management server 200 at an appropriate timing. However, since the capacity of the memory device 120 is limited, it is necessary to appropriately "save" the log data LOG corresponding to log data LOG_AI among the log data LOG acquired during the autonomous driving control in the memory device 120.

Therefore, in the present embodiment, a save determination using the log data LOG_HOLD is performed. In the save determination, it is determined whether or not information indicating that AI is involved is added to the log data LOG_HOLD. Then, the log data LOG_HOLD to which the information indicating that AI is involved is added is saved in the memory device 120. That is, in the present embodiment, the log data LOG determined to be log data LOG_AI and log data LOG_HOLD is handled as the log data LOG_SAVE.

The log data LOG determined to be the log data LOG_AI and log data LOG_HOLD is a target of the generation of the log data LOG_COPY, and the log data LOG_COPY is also a target of the transmission to the management server 200. Note that the log data LOG, which is the log data LOG_RL and also the log data LOG_HOLD, is not handled as the log data LOG_SAVE. Therefore, the log data LOG other than the target may be deleted from the memory device 120 or may be compressed and saved in the memory device 120.

4. Processing Example by Processor

Figure 5:
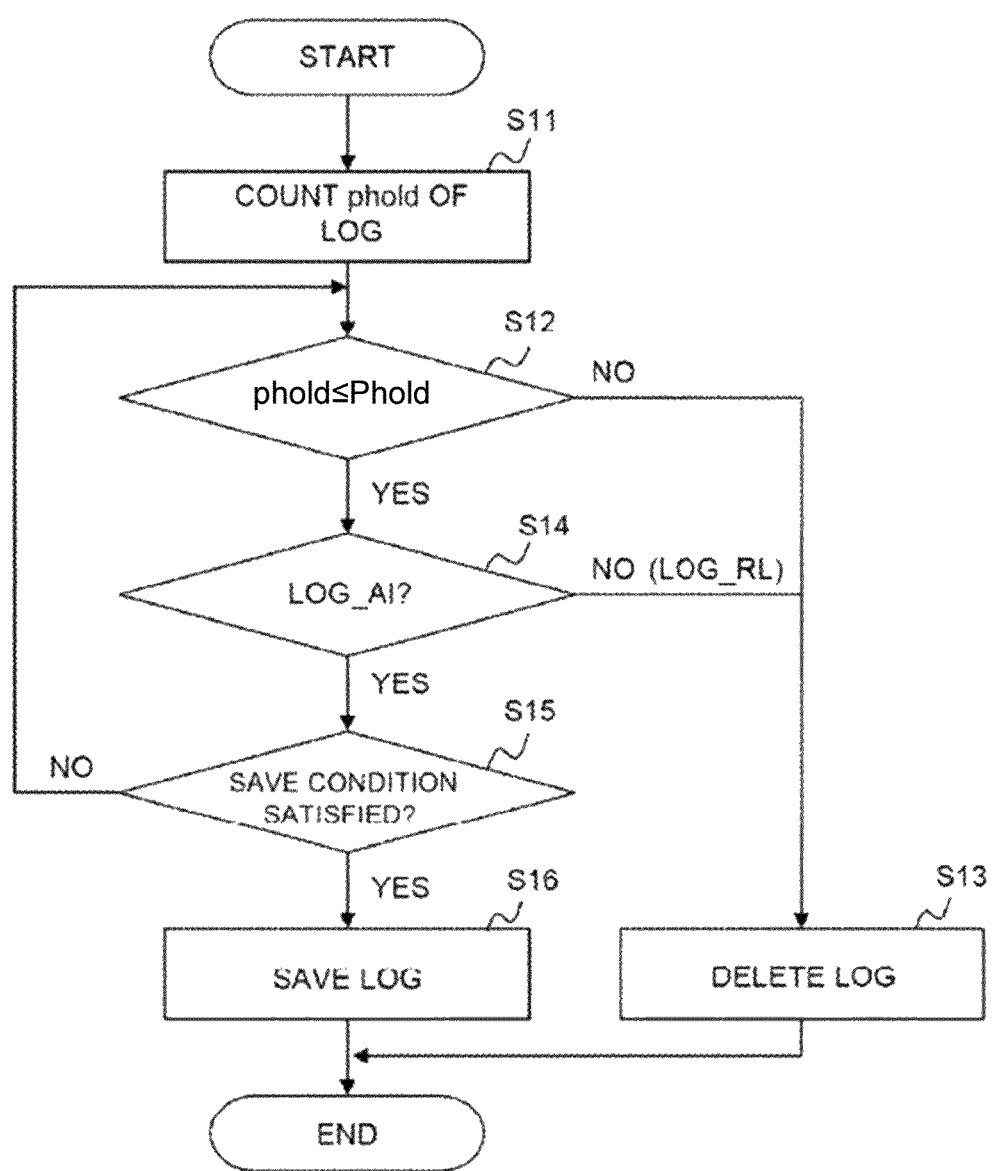
FIG. 5 is a flowchart showing a flow of processing performed by a processor, which is particularly related to the embodiment.
Figure 6:
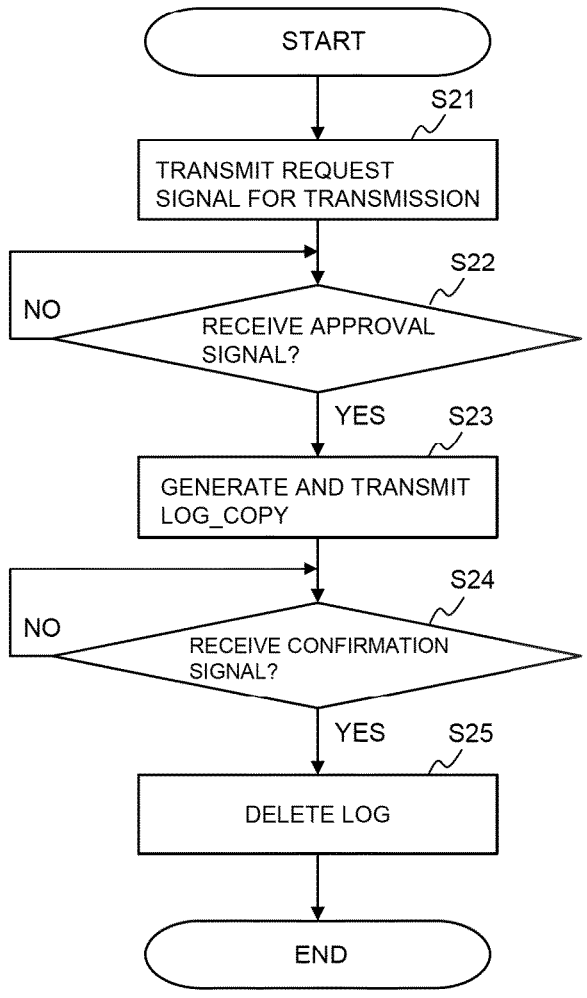
FIG. 6 is a flowchart showing a flow of processing performed by the processor, which is particularly related to the embodiment.

FIGS. 5 and 6 are flowcharts showing flow of processing by the processor 110, which is particularly relevant to the present embodiment. FIG. 5 illustrates processing related to handling of the log data LOG_HOLD, and FIG. 6 illustrates processing related to handling of the log data LOG_SAVE. The routines shown in FIGS. 5 and 6 are repeatedly executed at a predetermined control cycle.

In the routine shown in FIG. 5, first, a holding time phold of the log data LOG is counted (step S11). As described above, the log data LOG is acquired during the autonomous driving control and temporarily held. The holding time phold of the temporarily held log data LOG (i.e., the log data LOG_HOLD) is counted from the acquisition time by the processor 110.

Following the processing of step S11, it is determined whether the holding time phold of the log data LOG_HOLD is equal to or less than the holding time Phold (step S12). When the result of the determination in step S12 is negative, the log data LOG_HOLD is deleted (step S13). The log data LOG_HOLD is generated every moment. Therefore, in the processing of step S13, the log data LOG_HOLD whose holding time phold exceeds the holding time Phold is sequentially deleted. When the capacity of the memory device 120 is sufficient or when the capacity of the log data LOG_HOLD is small, the log data LOG_HOLD in which the holding time phold exceeds the holding time Phold may be compressed and saved in the memory device 120.

If the result of the determination in step S12 is positive, processing in step S14 is performed. In the processing of step S14, it is determined whether the log data LOG_HOLD corresponds to log data LOG_AI. The determination performed in the processing of step S14 is the above described save determination. When the result of the determination in step S14 is negative, the processing in step S13 is performed. That is, when the log data LOG_HOLD corresponds to the log data LOG_RL, the log data LOG_HOLD is deleted. The compression and save processing described in the description of the processing in step S13 can also be applied to the log data LOG_HOLD corresponding to the log data LOG_RL.

If the result of the determination in step S14 is positive, processing in step S15 is performed. In the process of step S15, it is determined whether a save condition is satisfied. Whether or not the save condition is satisfied can be determined based on whether the save target event STE has occurred. As described above, the save target event STE is an event that saves the log data LOG in the middle of the predetermined event PE in the memory device 21. Therefore, it is determined whether the predetermined event PE has occurred, and if it is determined that the predetermined event PE has occurred, the instruction INS_LOG described in FIG. 3 is referred to. Thus, it is possible to determine whether the save target event STE has occurred.

If the result of the determination in step S15 is negative, the processing returns to step S12. On the other hand, when the result of the determination in step S15 is positive, the log data LOG_HOLD is saved in the memory device 120 (step S16). In the processing of step S16, first, data in a predetermined period is extracted from the log data LOG_HOLD of the save target event STE with reference to the time when it is determined that the save target event STE has occurred. The concept of the predetermined period is as described in FIG. 4. The extracted log data LOG_HOLD is saved in the memory device 120. This log data LOG corresponds to the above-described log data LOG_SAVE.

In the routine shown in FIG. 6, first, a request signal for the transmission (upload) of the log data LOG_SAVE is transmitted to the management server 200 (step S21). Subsequently, it is determined whether an approval signal has been received (step S22). The approval signal is a signal transmitted from the management server 200 in response to the request signal transmitted by the processing in step S21. The transmission of the approval signal is waited according to the state of the management server 200. For example, when the amount of data stored in the database 220 exceeds the allowable amount, the transmission of the approval signal is waited.

The processing of step S22 is repeated until a positive determination result is obtained. If the positive determination result is obtained, a copy of the log data LOG_SAVE, that is, the log data LOG_COPY, is generated and transmitted to the management server 200 (step S23). When the log data LOG_COPY is transmitted, the data is encoded. When the transmission of all the log data LOG_COPY is completed, an end signal is transmitted to the management server 200.

Following the processing of step S23, it is determined whether a confirmation signal has been received (step S24). The confirmation signal is a signal transmitted from the management server 200 in response to the end signal transmitted by the processing in step S23. The transmission of the confirmation signal is waited according to the state of the management server 200. For example, the transmission of confirmation signal is waited until the storage of all log data LOG_COPY in the database 220 is completed.

The processing of step S24 is repeated until a positive determination result is obtained. If the positive determination result is obtained, the log data LOG is deleted from the memory device 120 (step S25). The deleted log data LOG is the original log data LOG (i.e., the log data LOG_SAVE) corresponding to the log data LOG_COPY. When the capacity of the memory device 120 is sufficient or when the capacity of the original log data LOG is small, the log data LOG may be compressed and then saved in the memory device 120.

4. Effect

According to the present embodiment, the log data LOG determined to be the log data LOG_AI and the log data LOG_HOLD can be saved in the memory device 120. Therefore, it is possible to appropriately save the log data LOG corresponding to the log data LOG_AI among log data LOG acquired during the autonomous driving control in the memory device 120. Further, instead of saving all the log data LOG determined to be the log data LOG_AI and the log data LOG_HOLD in the memory device 120, only the log data LOG of the save time Tsave based on the time when it is determined that save target event STE has occurred is stored, and therefore, it is also possible to suppress a situation in which the free capacity of the memory device 120 is insufficient.

According to the present embodiment, the log data LOG held after the holding time Phold elapses may be deleted from the memory device 120 or may be compressed and saved in the memory device 120. According to the present embodiment, the original log data LOG corresponding to the log data LOG_COPY may be deleted from the memory device 120 or compressed and saved in the memory device 120. Since the processing are to increase the free space of the memory device 120, it is possible to further suppress a situation in which the free space of the memory device 120 is insufficient.

What is claimed is:

1. A method for managing data related to a vehicle in which autonomous driving control is performed, the method comprising:

determining that (i) artificial intelligence is involved in computer processing for performing the autonomous driving control;

determining that (ii) a predetermined save condition is satisfied; and in response to determining that (i) the artificial intelligence is involved in the computer processing and that (ii) the predetermined save condition is satisfied, saving in a memory device of the vehicle at least one of input data and output data of the computer processing, wherein the input data being data that is input to the involved artificial intelligence and the output data being data that is output from the artificial intelligence within a predetermined save time before and after a timing at which the predetermined save condition is determined to be satisfied.

2. The method according to claim 1, further comprising:

temporarily storing the input and output data of the computer processing in the memory device of the vehicle;

counting a holding time in the memory device of the vehicle for each temporary holding data indicating data temporarily held in the memory device;

wherein, when it is determined that the artificial intelligence is involved in the computer processing and it is determined that the predetermined save condition is satisfied, data within the predetermined save time is extracted from the temporary holding data of which the holding time is equal to or less than a predetermined holding time and is stored in the memory device of the vehicle.

3. The method according to claim 2, further comprising:

deleting the temporary holding data from the memory device of the vehicle of which the holding time of which is greater than the predetermined holding time.

4. The method according to claim 1, further comprising:

storing a copy of the input and output data of the computer processing within the predetermined save time in a memory device outside the vehicle; and deleting original data from the memory device of the vehicle, wherein the original data corresponds to the copy data stored in the memory device outside the vehicle and has been saved in the memory device of the vehicle.

5. A device for managing data related to a vehicle in which autonomous driving control is performed, comprising a processor configured to perform computer processing for performing the autonomous driving control, wherein the processor is configured to:

determine (i) that artificial intelligence is involved in the computer processing;

determine (ii) that a predetermined save condition is satisfied; and in response to determining that (i) the artificial intelligence is involved in the computer processing and that (ii) the predetermined save condition is satisfied, save in a memory device of the vehicle at least one of input data and output data of the computer processing, wherein the input data being data that is input to the involved artificial intelligence within a predetermined save time before and after a timing at which it is determined that the predetermined save condition is satisfied.

6. The device according to claim 5, wherein the processor is further configured to:

temporarily store the input and output data of the computer processing in the memory device of the vehicle;

count a holding time in the memory device of the vehicle for each temporary holding data indicating data temporarily held in the memory device; and when it is determined that the artificial intelligence is involved in the computer processing and the predetermined save condition is satisfied, data within the predetermined save time is extracted from the temporary holding data in which the holding time is equal to or less than a predetermined holding time and is stored in the memory device of the vehicle.

7. The device according to claim 6, wherein the processor is further configured to delete the temporary holding data from the memory device of the vehicle of which the holding time of which is greater than the predetermined holding time.

8. The device according to claim 5, wherein the processor is further configured to:

transmit a copy of the input and output data of the computer processing within the predetermined save time in a memory device outside the vehicle; and delete original data from the memory device of the vehicle, wherein the original data corresponds to the copy data stored in a memory device outside the vehicle and has been saved in the memory device of the vehicle.

9. The method according to claim 1, further comprising determining that the predetermined save condition is satisfied based on whether a save target event has occurred.

10. The method according to claim 9, wherein the save target event corresponds to an event that saves log data in the middle of a predetermined event, the predetermined event being specified among a plurality of events related to a behavior of the vehicle.

11. The method according to claim 10, further comprising:

in response to determining that the predetermined event has occurred, referring to an instruction log that includes a plurality of identifiers, an event name, a priority, and an event determination status, the plurality of events being associated with a plurality of groups that relate to autonomous driving control of the vehicle and external recognition by the vehicle.

12. The method according to claim 9, wherein a length of the predetermined save time is variably set in accordance with a content of the occurred saved target event.

* * * * *